(12) United States Patent
Grois et al.

(10) Patent No.: US 11,770,523 B2
(45) Date of Patent: *Sep. 26, 2023

(54) PROCESSING MEDIA BY ADAPTIVE GROUP OF PICTURES STRUCTURING

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,524

(22) Filed: Sep. 8, 2022

(65) Prior Publication Data

US 2023/0071057 A1  Mar. 9, 2023

Related U.S. Application Data

(63) Continuation of application No. 16/456,749, filed on Jun. 28, 2019, now Pat. No. 11,470,310.

(51) Int. Cl.

| | |
|---|---|
| *H04N 19/114* | (2014.01) |
| *H04N 19/107* | (2014.01) |
| *H04N 19/12* | (2014.01) |
| *H04N 19/177* | (2014.01) |
| *G06T 7/13* | (2017.01) |
| *H04N 19/172* | (2014.01) |
| *H04N 19/14* | (2014.01) |

(52) U.S. Cl.
CPC ............. *H04N 19/114* (2014.11); *G06T 7/13* (2017.01); *H04N 19/107* (2014.11); *H04N 19/12* (2014.11); *H04N 19/14* (2014.11); *H04N 19/172* (2014.11); *H04N 19/177* (2014.11)

(58) Field of Classification Search
CPC .... H04N 19/114; H04N 19/107; H04N 19/12; H04N 19/14; H04N 19/172; H04N 19/177; G06T 7/13
USPC ...................................................... 375/240.12
See application file for complete search history.

(56) References Cited

U.S. PATENT DOCUMENTS

| 10,116,970 B1 | 10/2018 | Banerjee |
| 2005/0195897 A1 | 9/2005 | Cha |
| 2009/0092326 A1 | 4/2009 | Fukuhara et al. |

(Continued)

OTHER PUBLICATIONS

U.S. Patent Application filed Jun. 28, 2019, entitled "Processing Media By Adaptive Group of Pictures (GOP) And Mini-GOP Structuring", U.S. Appl. No. 16/456,749.

*Primary Examiner* — Nguyen T Truong
(74) *Attorney, Agent, or Firm* — BakerHostetler

(57) ABSTRACT

A spatial complexity and a temporal complexity associated with one or more frames of media content may be determined. Based on the spatial complexity and the temporal complexity of the media content, a Group of Picture (GOP) size for the one or more frames of the media content may be determined. The GOP size may be inversely proportional to the spatial complexity and the temporal complexity of the one or more frames of media content. Certain frames of the media content may be arranged in a different GOP size as compared to one or more other frames of the media content. By varying the GOP size of the plurality of frames of the media content, the bitrate required to transmit the media content may be decreased without decreasing or substantially decreasing the overall quality of the media content.

36 Claims, 8 Drawing Sheets

(56) References Cited

U.S. PATENT DOCUMENTS

2016/0119588 A1 4/2016 Bjorn
2016/0277759 A1 9/2016 Edpalm et al.
2019/0045195 A1 2/2019 Gokhale et al.

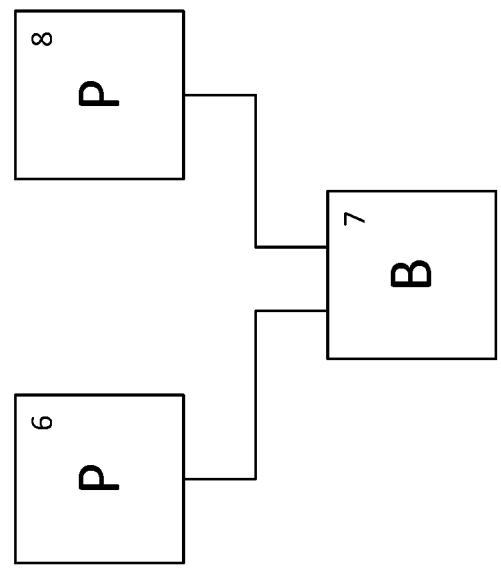
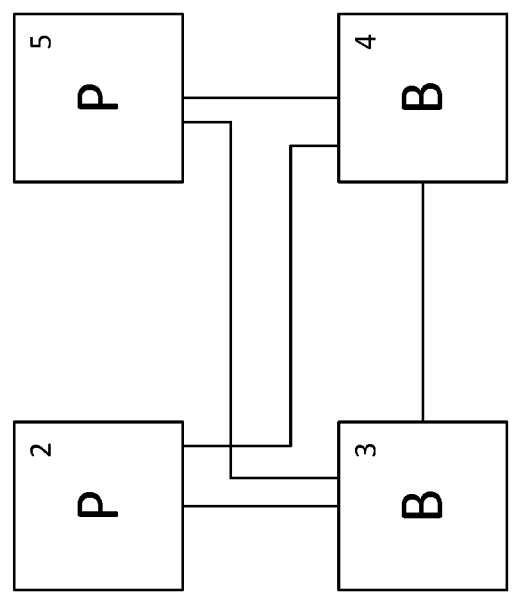
FIG. 4A
FIG. 4B

PROCESSING MEDIA BY ADAPTIVE GROUP OF PICTURES STRUCTURING

CROSS-REFERENCE TO RELATED APPLICATIONS

This application is a continuation of U.S. patent application Ser. No. 16/456,749, filed Jun. 28, 2019, now U.S. Pat. No. 11,470,310, issued Oct. 11, 2022, which is hereby incorporated herein by reference for any and all purposes.

BACKGROUND

Video compression techniques may be used to compress video content in an efficient manner, thereby enabling high-quality video content to be provided to customers while minimizing the bandwidth required to transmit that video content. As video quality continues to improve, the computational complexities for processing the video content and the bitrate requirements for transmitting the video content may also increase. There is currently a need to reduce bit-rate requirements, particularly for high-resolution video content, without decreasing perceived video content quality and while keeping computational complexity at a reasonable level.

SUMMARY

Methods and systems for improved media content (e.g., video content) compression are described. A spatial complexity associated with one or more frames of media content may be determined. Determining the spatial complexity of the one or more frames of the media content may comprise performing a frequency analysis of the one or more frames in order to determine an amount of high frequency components and low frequency components of the one or more frames. A temporal complexity associated with the one or more frames of the media content may be determined. Determining the temporal complexity of the one or more frames of the media content may comprise determining an amount of motion between the one or more frames of the media content. Based on the spatial complexity and the temporal complexity of the media content, a Group of Picture (GOP) size for the one or more frames of the media content may be determined. The GOP size may be inversely proportional to the spatial complexity and the temporal complexity of the one or more frames of media content. Certain frames of the media content may be arranged in a different GOP size as compared to one or more other frames of the media content. By varying the GOP size of the plurality of frames of the media content, the bitrate required to transmit the media content may be decreased without decreasing or substantially decreasing the overall quality of the media content.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIGS. 4A and 4B show examples of mini-GOP hierarchical structures.

DETAILED DESCRIPTION OF ILLUSTRATIVE EMBODIMENTS

The first version of the H.265/MPEG-HEVC (High Efficiency Video Coding) standard enabled for the efficient compression of high-resolution video content (e.g., 3840×2160 (4K) video) as compared to its predecessor H.264/MPEG-AVC. This compression provided a good trade-off between the visual quality of the content and its corresponding bit-rate. The Versatile Video Coding (VVC) standard is being developed with the ultra high-definition UltraHD and high frame rate video requirements in mind (such as 7680×4320 (8K) video). However, the average computational complexity of VVC is expected to be several times higher than of its predecessor (e.g., HEVC). There is currently a need to reduce bit-rate requirements, particularly for high-resolution video content, without decreasing perceived video content quality and while keeping computational complexity at a reasonable level.

Accordingly, methods and systems are described for improved video compression. A spatial complexity associated with one or more frames of media content may be determined. Determining the spatial complexity of the one or more frames of the media content may comprise performing a frequency analysis of the one or more frames in order to determine an amount of high frequency components and low frequency components of the one or more frames. A temporal complexity associated with the one or more frames of the media content may be determined. Determining the temporal complexity of the one or more frames of the media content may comprise determining an amount of motion between the one or more frames of the media content. Based on the spatial complexity and the temporal complexity of the media content, a Group of Picture (GOP) size for the one or more frames of the media content may be determined. The GOP size may be inversely proportional to the spatial complexity and the temporal complexity of the one or more frames of media content. Certain frames of the media content may be arranged in a different GOP size as compared to one or more other frames of the media content. By varying the GOP size of the plurality of frames of the media content, the bitrate required to transmit the media content may be decreased without decreasing or substantially decreasing the overall quality of the media content.

Figure 1:
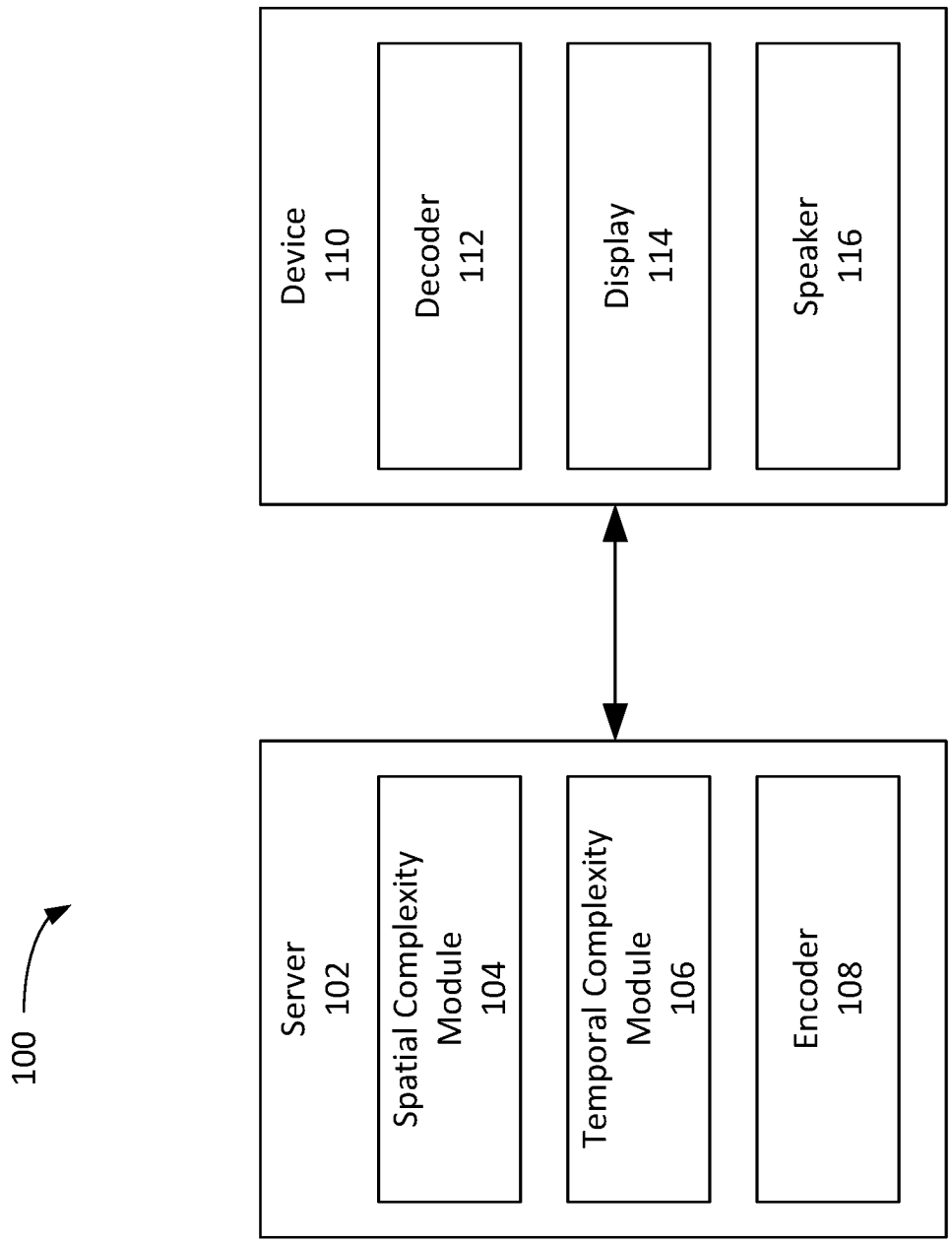
FIG. 1 shows a block diagram of an example system.

FIG. 1 shows a block diagram of an example system 100. The system 100 may comprise a server 102 and a device 110. The server 102 may be configured to determine a GOP size for one or more frames of a plurality of frames of media content. The server 102 may comprise a spatial complexity module 104, a temporal complexity module 106, and an encoder 108. The device 110 may be configured to play back media content. The device 110 may be any device capable of playing back media content, such as a set-top box, a mobile telephone, a tablet or a personal computer. The device 110 may comprise a decoder 112, a display 114 and a speaker 116.

The spatial complexity module 104 may be configured to determine a spatial complexity of one or more frames of media content. The spatial complexity of the one or more frames of media content may be determined by applying one or more of a Fast Discrete Cosine Transform (DCT) or a Fast Fourier Transform (FFT) to the one or more frames of the media content to produce one or more transformed coefficients. The one or more transformed coefficients may be analyzed to determine an amount of low frequency information and/or an amount of high frequency information concentrated within the coefficients as compared to the overall amount of information.

When the image texture of a frame is not particularly detailed, the amount of high frequency information in the frame may be insignificant compared to the overall amount of picture frame information. Since the image texture of the frame is not particularly detailed, the frame may be encoded using relatively large GOPs, such as 32 or 64 frames. In contrast, when the image texture of the frame is more detailed, the amount of high frequency information of the frame may be significant compared to the overall amount of picture frame information. Since the image texture is more detailed, the frame may be encoded using relatively small GOPs, such as 8 or 16 frames.

The spatial complexity module 104 may be configured to apply one or more filters, such as an edge detection filter and/or a high pass filter, to the one or more frames of media content to determine the spatial complexity of the one or more frames of the media content. The filtering techniques can be applied in addition to or alternatively to the Fast DCT/FFT techniques described herein. The spatial complexity of the one or more frames of media content may be determined based on analyzing the one or more frames through the one or more filters. The more edges a frame has, and particularly, the more small edges a frame has, the higher its estimated spatial complexity. Thus, smaller GOP sizes may be used to achieve better coding efficiency. Frames with a fewer number of edges may have less fine details within the picture, and as a result, may be encoded using larger GOP sizes.

The temporal complexity module 106 may be configured to determine an amount of motion in the one or more frames of the media content. The temporal complexity module 106 may analyze the differences between the frames in order to determine the amount of motion in the one or more frames of the media content. When it is determined that there is not much motion in the video content, such as in a video with a newscaster reading news, or a person sitting on a sofa and watching TV, the GOP size can be larger, thereby resulting in better coding efficiency by decreasing an overall amount of I or P frames. Such temporal complexity may be determined, for example, by means of the Mean Co-Located Pixel Difference (MCPD) metric, which indicates the difference between co-located pixels in consecutive frames. Variances between the frames may be calculated and evaluated. The larger the difference between the frames, the larger the motion complexity, which may lead to smaller GOP sizes.

A media content may comprise a number of different types of frames. A media content may comprise one or more of an I-frame, a P-frame and a B-frame. An I-frame (i.e., an intra-coded picture) comprises an entirety of the image information associated with the frame. An I-frame may be encoded independent of all other frames of the media content. In contrast to I-frames, P and B frames may hold only part of the image information (the part that changes between frames), so they may need less space in the output file than an I-frame. A P-frame (i.e., a predicted picture) may hold only the changes in the image from the previous frame. For example, in a scene where a car moves across a stationary background, only the car's movements need to be encoded. The encoder does not need to encode the unchanging background pixels in the P-frame, thus saving space. P-frames are also known as delta-frames. A B-frame (i.e., a bidirectional predicted picture) saves even more space by using differences between the current frame and both the preceding and following frames to specify its content.

A GOP may begin with an I-frame and may end with a frame (e.g., a P frame or a B frame) that immediately precedes a next I-frame in the sequence of frames. A GOP may comprise one or more mini-GOPs, each of which may start with a P-frame and may end with another P-frame. In-between these P-frames may be one or more B-frames which depend on the above-mentioned P-frame(s). It should be noted that either the GOP and/or the mini-GOPs may have a hierarchical structure with several levels of dependences.

The encoder 108 may be configured to convert the media content from one format to another format, such as one amenable to the means by which the content distributor's users view the content. For example, encoding the media content may comprise converting the media content from a Flash Video (FLV) format to an MPEG-4 video stream. Encoding the media content may comprise compressing the media content using digital audio/video compression, such as MPEG, or any other type of compression standards.

The encoder 108 may be configured to determine an optimal GOP size for the one or more frames of the media content. The encoder 108 may receive from the spatial complexity module 104 an indication of the spatial complexity of the one or more frames of the media content, such as an indication that the frames have high spatial complexity or an indication that the frames have low spatial complexity. The encoder 108 may receive from the temporal complexity module 106 an indication of the temporal complexity of the one or more frames of the media content, such as an indication that the frames have high temporal complexity or an indication that the frames have low temporal complexity. Based the indications received from the spatial complexity module 104 and/or the temporal complexity module 106, the encoder 108 may determine an appropriate GOP size and/or mini-GOP size for the one or more frames of the media content, and may encode the one or more frames of the media content based on the determined GOP size and/or the determined mini-GOP size.

Based on receiving an indication that one or more frames of the media content have low spatial complexity and/or low temporal complexity, the encoder 108 may be configured to encode one or more frames of the media content using a large GOP size, such as 32 or 64 frames. In contrast, based on receiving an indication that the one or more other frames of the media content have high spatial complexity and/or high temporal complexity, the encoder 108 may be configured to encode the one or more other frames of the media content using a small GOP size, such as 8 or 16 frames.

The decoder 112 of the device 110 may be configured to receive the encoded video segments from the server 102 and may be configured to decode the one or more video segments. The decoder 112 may decode the video segments based on information received from the server 102 and/or information stored at the decoder 112 such as device-specific or standards-specific decoding information. The decoder 112 may be configured to compress and/or reconstruct the received video segments from the encoder 108 such that the one or more video segments may be played back by the device 110.

The display 114 of the device 110 may be configured to display media content to one or more viewers. The display 114 may be any device capable of displaying video or image content to a viewer, such as a tablet, a computer monitor, or a television screen. The display 114 may be part of the device 110 such as in the example that the device 110 is a tablet or a computer. The display 114 may be separate from the device 110 such as in an example that the device 110 is a set top box and the display 114 is a television screen in electrical communication with the set top box.

The speaker 116 may be configured to output audio associated with the media content. The speaker 116 may be any device capable of outputting audio content. The speaker 116 may be part of the device 110 such as in the example that the device 110 is streaming player or a tablet or a computer. The speaker 116 may be separate from the device 110 such as in an example that the device 110 is a set top box and the speaker 116 is a television or other external speaker in electrical communication with the set top box.

Figure 2A:
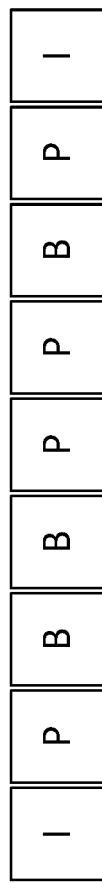
FIGS. 2A and 2B show an example Group of Pictures (GOP)
Figure 2B:
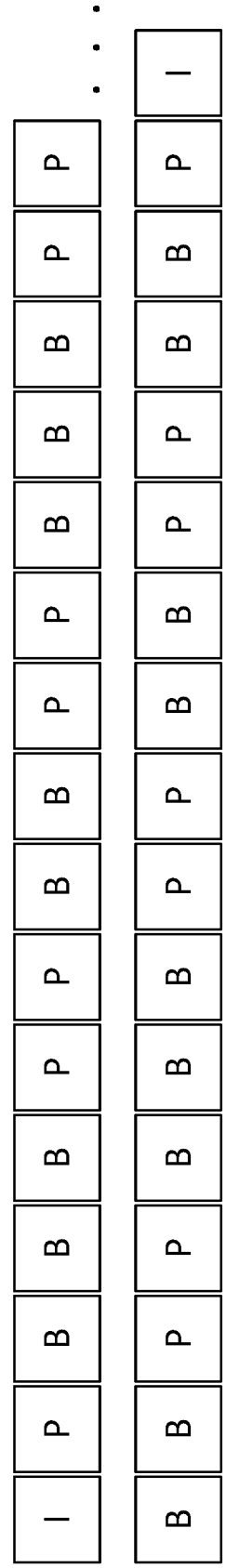

FIGS. 2A and 2B show example frames of media content arranged in a GOP. A media content may comprise a number of different types of frames, including I-frames, P-frames and/or B-frames. As shown in FIG. 2A and FIG. 2B, each GOP may start with an I-frame. The GOP shown in FIG. 2A comprises 8 frames arranged in the following order: I, P, B, B, P, P, B, P. The last I-frame shown in FIG. 2A is an I-frame that may be an individual I-frame or may be the beginning of a next GOP. A GOP comprised of 8 frames may be considered a small GOP and may be used for media content having high spatial complexity and/or high temporal complexity. The GOP shown in FIG. 2B comprises 32 frames arranged in the following order: I, P, B, B, B, P, P, B, B, P, P, B, B, P, P, B, B, P, P, B, B, B, P, P, B, B, P, P, B, B, P, P. The last I-frame shown in FIG. 2B is an I-frame that may be an individual I-frame or may be the beginning of a next GOP. A GOP comprised of 32 frames may be considered a large GOP and may be used for frames having low spatial complexity and/or low temporal complexity.

A mini-GOP may start with a P-frame in a sequence of frames and may end with the next P-frame in the sequence of frames. The media content shown in FIG. 2A may comprise two mini-GOPs. A first mini-GOP may start with the second frame of the media content which is a P-frame and may end with the fifth frame of the media content which is another P-frame. A second mini-GOP may begin with the sixth frame which is a P-frame and may end with the eighth frame which is also a P-frame. The media content in FIG. 2B comprises a number of mini-GOPs. A first-mini GOP may start with the second frame of the media content which is a P-frame and may end with the sixth frame of the media content which is another P-frame. A second mini-GOP may start with the seventh frame of the media content which is a P-frame and may end with the tenth frame of the media content which is also a P-frame. The media content shown in FIG. 2B may comprise one or more other mini-GOPs.

The GOP and/or the mini-GOP may be arranged in one or more hierarchical structures. The hierarchical structure may comprise two or more layers (which may also be referred to as levels). A frame from a lower layer may be able to reference frames from a higher layer in the hierarchical structure. However, a frame from a higher layer may not be able to reference frames from any of the lower layers in the hierarchical structure.

Figure 3:
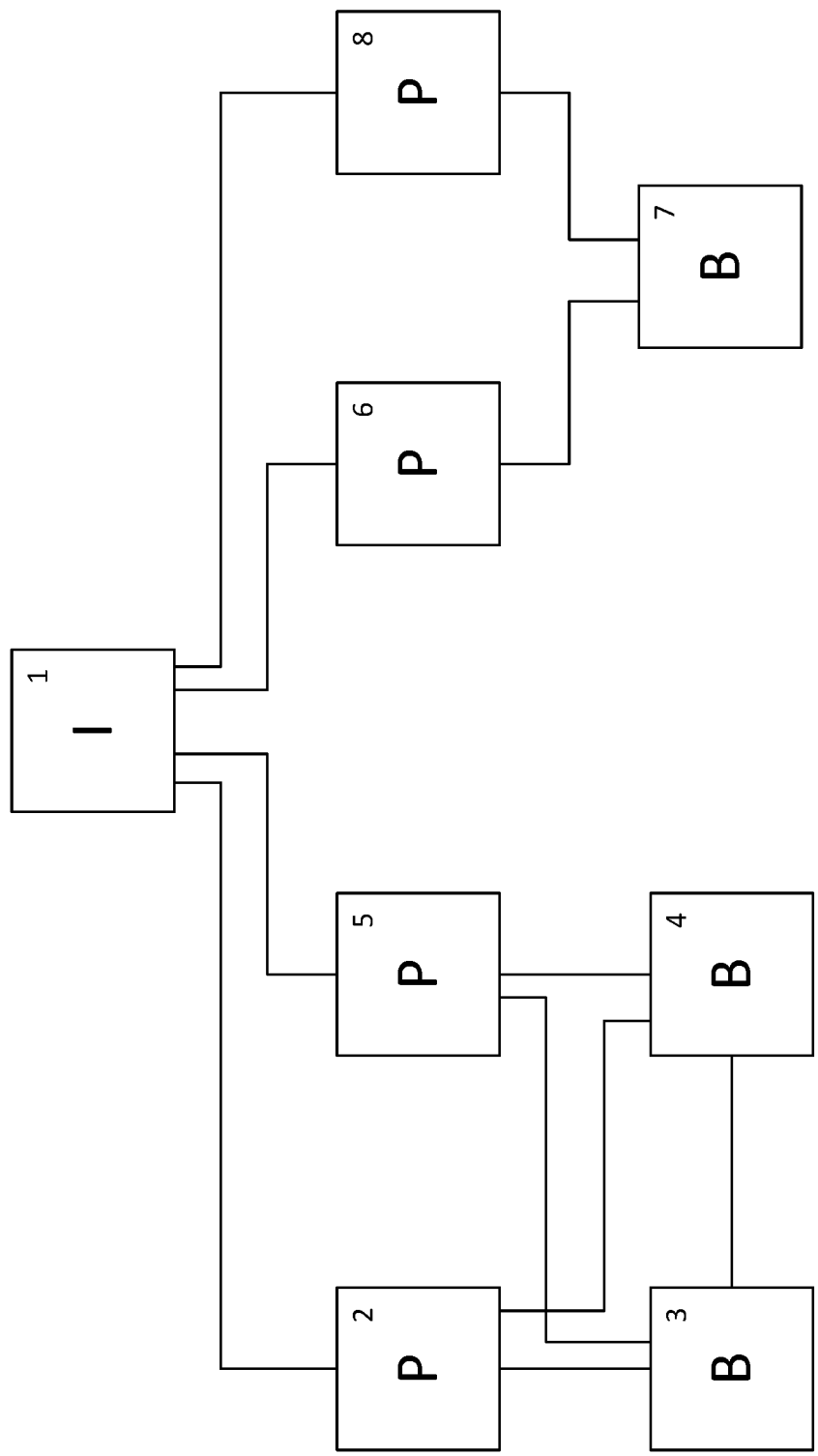
FIG. 3 shows an example of a GOP hierarchical structure.

An example hierarchical structure for a GOP is shown in FIG. 3. As discussed above, an example GOP may comprise eight frames ordered in the following sequence: I, P, B, B, P, P, B, P. A first layer of the hierarchical structure may comprise an I-frame. The I-frame may be an independent frame that does not use any of the other frames of the media content for reference purposes. The second layer of the hierarchical structure may comprise the P-frames of the media content (e.g., the second, fifth, sixth and eighth frames of the media content). The P-frames of the media content may access information associated with the I-frame in order to reduce the overall size of the media content. In an example where the spatial complexity and/or the temporal complexity between the frames is small, the difference between the I-frame and the P-frames of the GOP may also be small since only the differences between the I-frame and the P-frames may need to be encoded. The third layer of the hierarchical structure may comprise the B-frames of the media content (e.g., the third, fourth and seventh frames of the media content). The B-frames of the media content may access information associated with both the I-frames and the P-frames of the media content depending on their location in the hierarchical structure.

FIGS. 4A and 4B show examples of mini-GOP hierarchical structures. A first mini-GOP shown in FIG. 4A may begin with the second frame of the media content and may end with the fifth frame of the media content, both of which are P-frames. The first mini-GOP may also comprise the third frame and the fourth frame of the media content, both of which are B-frames. The B-frames may access information associated with one or more of the P-frames and/or information associated with the other B-frames of the media content for encoding purposes. A second mini-GOP shown in FIG. 4B may begin with the sixth frame of the media content and may end with the eighth frame of the media content, both of which are P-frames. The second mini-GOP may also comprise the seventh frame of the media content, which is a B-frame. The B-frame may access information associated with either of the P-frames of the second mini-GOP for encoding purposes.

The hierarchical structure for the GOP and/or the mini-GOP may be determined and/or changed throughout the encoding process in a dynamic manner.

Figure 5:
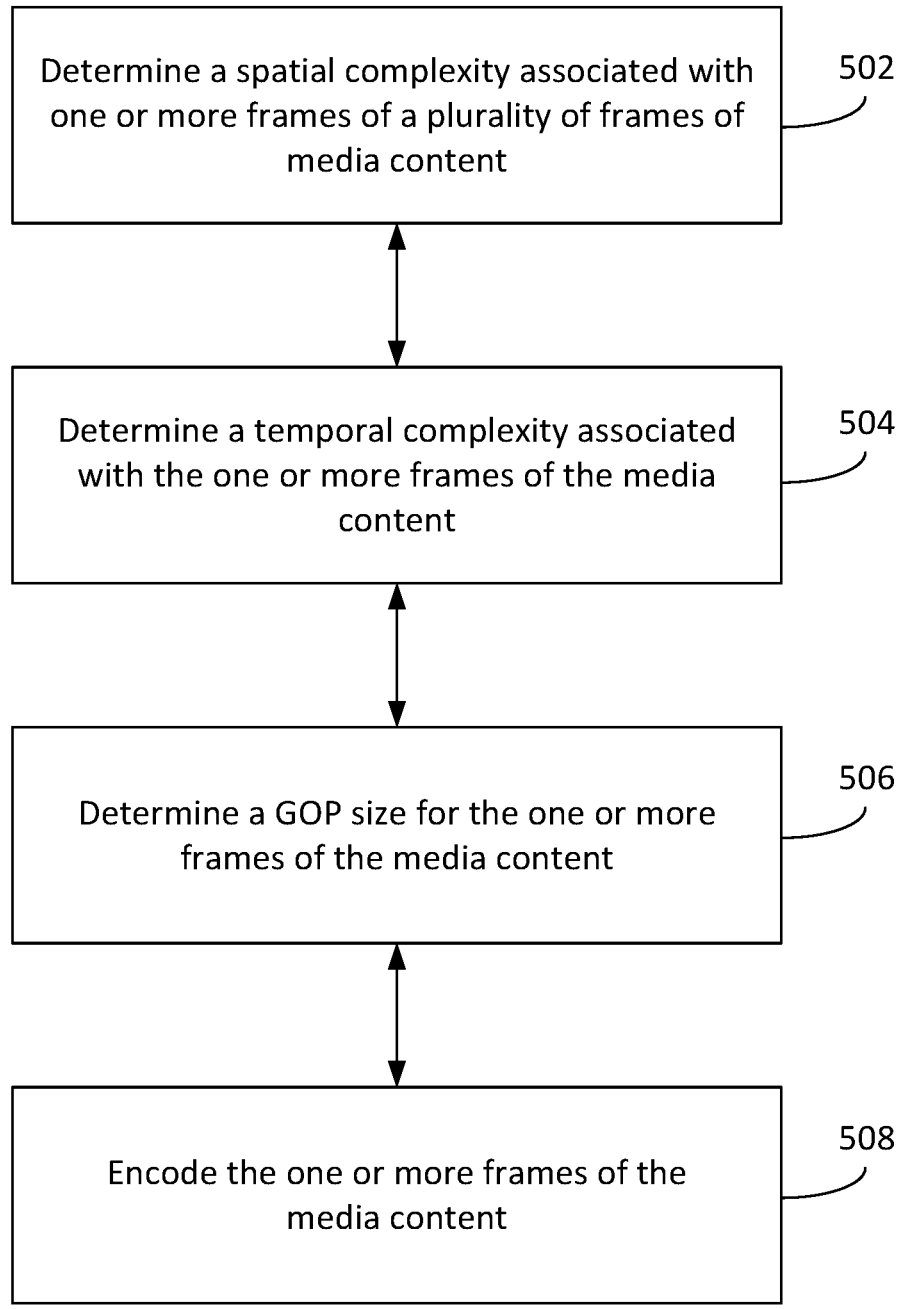
FIG. 5 shows a flow chart of an example method.

FIG. 5 shows a flow chart of an example method 500. At step 502, a spatial complexity associated with one or more frames of a plurality of frames of media content may be determined. The spatial complexity associated with one or more frames of the plurality of frames of media content may be determined by a spatial complexity module, such as the spatial complexity module 104 shown in FIG. 1.

Determining the spatial complexity of the one or more frames of media content may comprise applying at least one of a Fast Discrete Cosine Transform (DCT) or a Fast Fourier Transform (FFT) to the one or more frames of the media content. One or more transformed coefficients generated from the application of the Fast DCT or the FFT to the one or more frames of the media content may be analyzed to determine an amount of low frequency information and/or an amount of high frequency information concentrated within the coefficients as compared to the overall amount of information.

When the image texture of a frame is not particularly detailed, the amount of high frequency information in the frame may be insignificant compared to the overall amount of picture frame information. Since the image texture of the frame is not particularly detailed, the frame may be encoded using relatively large GOPs, such as 32 or 64 frames. In contrast, when the image texture of the frame is more detailed, the amount of high frequency information of the frame may be significant compared to the overall amount of picture frame information. Since the image texture is more detailed, the frame may be encoded using relatively small GOPs, such as 8 or 16 frames.

Determining the spatial complexity associated with the one or more frames of the media content may comprise applying one or more filters to the one or more frames of the media content. The spatial complexity module 104 may be configured to apply one or more filters, such as an edge detection filter and/or a high pass filter, to the one or more frames of media content to determine the spatial complexity of the one or more frames. The filtering techniques can be applied in addition to or alternatively to the Fast DCT/FFT techniques described herein. The spatial complexity of the one or more frames may be determined based on analyzing the one or more frames through the one or more filters. The more edges a frame has, and particularly, the more small edges a frame has, the higher its estimated spatial complexity. Thus, smaller GOP sizes may be used to achieve better coding efficiency. Frames with a fewer number of edges may have less fine details within the picture, and as a result, may be encoded using larger GOP sizes.

At step 504, a temporal complexity associated with the one or more frames of the media content may be determined. The temporal complexity of the one or more frames of the media content may be determined by a temporal complexity module 106 of a server, such as the temporal complexity module 106 of the server 102 shown in FIG. 1. Determining a temporal complexity of the one or more frames of the media content may comprise determining an amount of motion in the one or more frames of the media content. When it is determined that there is not much motion in the video content, such as in a video with a newscaster reading news, or a person sitting on a sofa and watching TV, the GOP size can be larger, thereby resulting in better coding efficiency by decreasing an overall amount of I or P frames.

The temporal complexity of the one or more frames of the media content may be determined, for example, by applying a Mean Co-Located Pixel Difference (MCPD) metric to the one or more frames of the media content, which may indicate the difference between co-located pixels in consecutive frames. Variances between the frames may be calculated and evaluated. The larger the difference between the frames, the larger the motion complexity, which may lead to smaller GOP sizes.

Determining the spatial complexity of the one or more frames of the media content and/or the temporal complexity of the one or more frames of the media content may comprise performing one or more pre-processing operations on the one or more frames of the media content. In other words, the spatial complexity and/or the temporal complexity of the one or more frames of the media content may be determined prior to the encoding process in order to reduce latency that would otherwise be introduced during the encoding process.

At step 506, a GOP size for the one or more frames of the media content may be determined. The GOP size for the one or more frames of the media content may be determined by an encoder, such as the encoder 108 shown in FIG. 1. The GOP size for the one or more frames of the media content may be determined based on analyzing the spatial complexity associated with the one or more frames of the media content and/or the temporal complexity associated with the one or more frames of the media content.

The encoder may be configured to determine an optimal GOP size for the one or more frames of the media content. The encoder may receive from the spatial complexity module an indication of the spatial complexity of the one or more frames of the media content, such as an indication that the frames have high spatial complexity or an indication that the frames have low spatial complexity. The encoder may receive from the temporal complexity module an indication of the temporal complexity of the one or more frames of the media content, such as an indication that the frames have high temporal complexity or an indication that the frames have low temporal complexity. Based the indications received from the spatial complexity module and/or the temporal complexity module, the encoder may determine an appropriate GOP size for the one or more frames of the media content and may encode the one or more frames of the media content based on the determined GOP size.

Based on receiving an indication that one or more frames of the media content have low spatial complexity and/or low temporal complexity, the encoder may be configured to encode one or more frames of the media content using a large GOP size, such as 64 frames. Based on receiving an indication that one or more other frames of the media content have high spatial complexity and/or high temporal complexity, the encoder may be configured to encode the one or more other frames of the media content using a small GOP size, such as 8 frames. The GOP size for the one or more frames of the media content may be inversely proportional to the spatial complexity associated with the one or more frames of the media content and the temporal complexity associated with the one or more frames of the media content.

At step 508, the one or more frames of the media content may be encoded. The one or more frames of the media content may be encoded the encoder 108 shown in FIG. 1. The one or more frames of the media content may be encoded based on the determined GOP size for the one or more frames of the media content. The GOP size for the one or more frames of the media content may be different than a GOP size for one or more other frames of the plurality of frames of the media content. For example, a first set of one or more frames of a media content (e.g., a television show) may be determined to have low spatial complexity and/or low temporal complexity, and thus may be encoded using a large GOP size. A second set of one or more frames of the same media content may be determined to have high spatial complexity and/or high temporal complexity, and thus may be encoded using a small GOP size. Thus, certain frames of the media content may be arranged in a different GOP size as compared to one or more other frames of the media content. By varying the GOP size of the plurality of frames of the media content, the bitrate of the media content may be decreased without decreasing or substantially decreasing the overall quality of the media content.

Determining a GOP size for the one or more frames of the media content may additionally or alternatively comprise determining one or more mini-GOP sizes for the one or more frames of the media content. A GOP may begin with an I-frame and may comprise any number of P and B frames following I-frame. The GOP may terminate with the frame that immediately precedes the next I-frame in the sequence of frames. A mini-GOP may comprise a portion of the GOP. The mini-GOP may begin with a P-frame and end with a next P-frame in the sequence of frames. As shown in FIG. 2A, a GOP may comprise eight frames ordered in the following sequence: I, P, B, B, P, P, B, P. The GOP may comprise one or more mini-GOPs. A first mini-GOP may comprise the second frame (P-frame), the third frame (B-frame), the fourth frame (B-frame) and the fifth frame (P-frame). A second mini-GOP may comprise the sixth frame (P-frame), the seventh frame (B-frame), and the eight frame (P-frame).

At least one mini-GOP and at least one corresponding mini-GOP size for the one or more frames of the media content may be determined based on analyzing the spatial complexity associated with the one or more frames of the media content and the temporal complexity associated with the one or more frames of the media content. The procedures for determining the mini-GOP size for the one or more frames of the media content may be similar to the procedures for determining the GOP sizes for the one or more frames of the media content. The one or more frames of the media content may be encoded based on the determined mini-GOP size for the one or more frames of the media content.

The GOP and/or the mini-GOP may be arranged in one or more hierarchical structures. The hierarchical structure may comprise one or more layers. A frame from a higher layer may be able to reference frames from a lower layer in the hierarchical structure. However, a frame from a lower layer may not be able to reference frames from any of the higher layers in the hierarchical structure. Using the example above and as shown in 2A, a GOP may comprise eight frames ordered in the following sequence: I, P, B, B, P, P, B, P. A first layer of the hierarchical structure may comprise the I-frame. A second layer of the hierarchical structure may comprise the second frame, which is a P-frame. The P-frame may be able to reference the I-frame in the first layer of the hierarchical structure. A third layer of the hierarchical structure may comprise the third frame (B-frame), the fifth frame (P-frame), the seventh frame (B-frame), and the eight frame (P-frame). The frames of the third layer may be able to use any of the frames from the first layer and/or the second layer for prediction purposes. However, the frames of the third layer may not be able to reference the frames of the fourth layer for prediction purposes. A fourth layer of the hierarchical structure may comprise the fourth frame (B-frame) and the sixth frame (P-frame). The frames from the fourth layer may be able to use any of the frames from the first layer, the second layer and/or the third layer for prediction purposes.

The GOP and/or mini-GOP hierarchical structures may vary accordingly: the larger the spatial complexity and/or temporal complexity is, the more complex the hierarchical structure should be, thereby leading to a larger number of temporal layers in which picture frames have different distances from their corresponding references in order to increase coding efficiency and reduce bandwidth. The number of hierarchical layers may be increased or decreased accordingly, e.g. in an adaptive manner, thereby leading to an optimal coding gain. The hierarchical structure can further vary from hierarchical P-frame coding to hierarchical B-frame coding or any combination thereof, depending on the determined spatial and/or temporal picture frame complexity.

The GOP and/or the mini-GOP size of one or more frames of media content change dynamically throughout the encoding process. A first set of one or more frames of the media content may comprise a first scene of the media content, such as a first scene of a television show. The first set of the one or more frames of media content may be determined to have high spatial complexity and/or high temporal complexity. Based on this determination, the first set of one or more frames of the media content may be encoded using a small GOP, such as 8 frames of media content. However, the GOP size of the frames of the media content may change dynamically throughout the encoding process based on the spatial complexity and/or the temporal complexity of the frames of the media content. For example, a second set of frames of the media content (e.g., a next scene in the same television show) may comprise frames having low spatial complexity and/or low temporal complexity. Thus, the second set of one or more frames of the media content may be encoded using a large GOP, such as 32 frames of media content. It is understood that the one or more frames of the mini-GOP may change dynamically as well throughout the encoding process of the one or more frames of media content.

Figure 6:
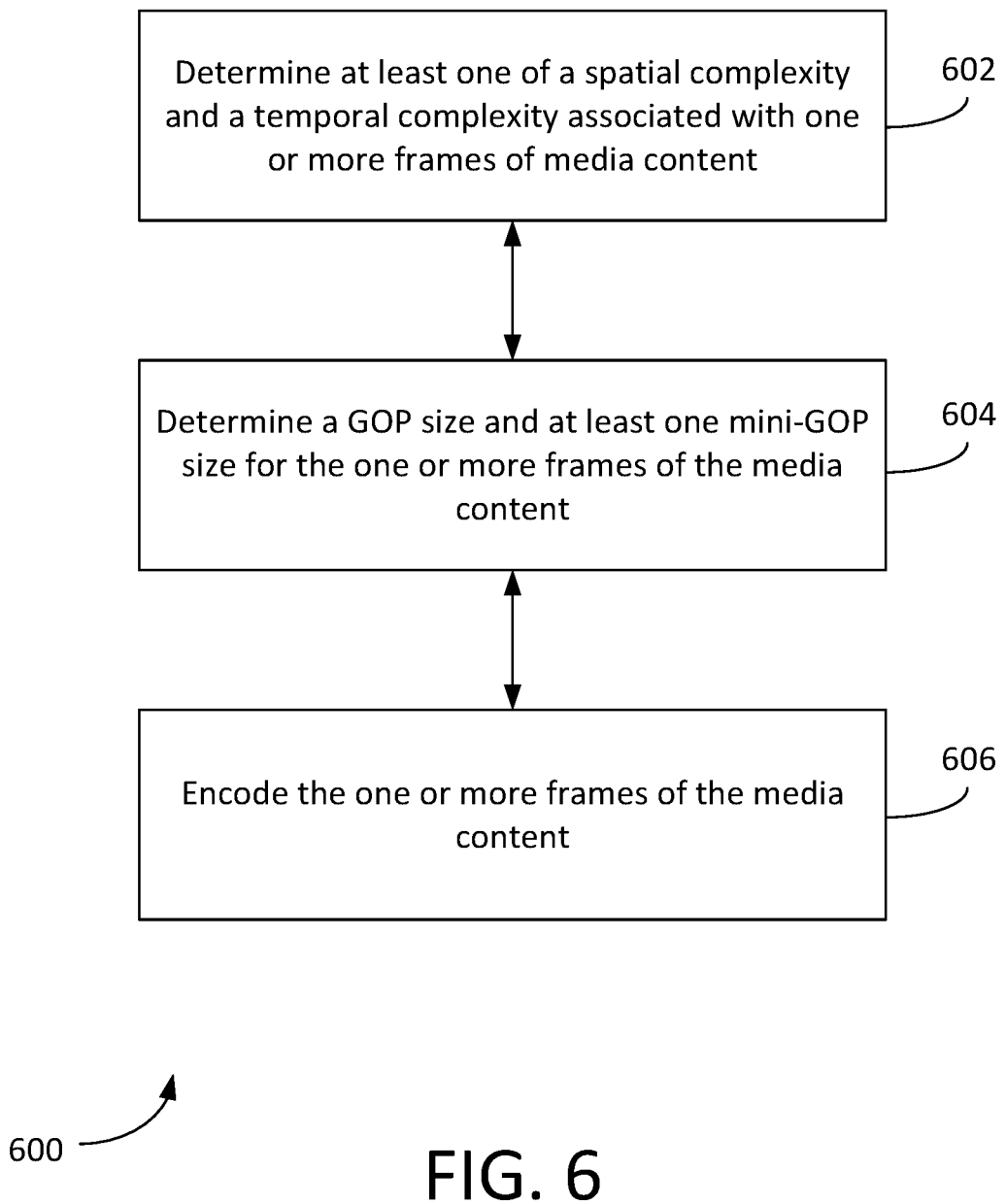
FIG. 6 shows a flow chart of an example method.

FIG. 6 shows a flow chart of an example method 600. At step 602, at least one of a spatial complexity associated with one or more frames of media content and a temporal complexity associated with the one or more frames of the media content may be determined. The spatial complexity associated with the one or more frames of the media content may be determined by a spatial complexity module, such as the spatial complexity module 104 shown in FIG. 1. The temporal complexity of the one or more frames of the media content may be determined by a temporal complexity module 106 of a server, such as the temporal complexity module 106 of the server 102 shown in FIG. 1. Determining at least one of the spatial complexity associated with one or more frames of media content and the temporal complexity associated with the one or more frames of the media content may comprise determining both of the spatial complexity associated with one or more frames of media content and the temporal complexity associated with the one or more frames of the media content.

Determining the spatial complexity of the one or more frames of media content may comprise applying at least one of a Fast Discrete Cosine Transform (DCT) or a Fast Fourier Transform (FFT) to the one or more frames of the media content. One or more transformed coefficients generated from the application of the Fast DCT or the FFT to the one or more frames of the media content may be analyzed to determine an amount of low frequency information and/or an amount of high frequency information concentrated within the coefficients as compared to the overall amount of information.

When the image texture of a frame is not particularly detailed, the amount of high frequency information in the frame may be insignificant compared to the overall amount of picture frame information. Since the image texture of the frame is not particularly detailed, the frame may be encoded using relatively large GOPs, such as 32 or 64 frames. In contrast, when the image texture of the frame is more detailed, the amount of high frequency information of the frame may be significant compared to the overall amount of picture frame information. Since the image texture is more detailed, the frame may be encoded using relatively small GOPs, such as 8 or 16 frames.

Determining the spatial complexity associated with the one or more frames of the media content may comprise applying one or more filters to the one or more frames of the media content. The spatial complexity module may be configured to apply one or more filters, such as an edge detection filter and/or a high pass filter, to the one or more frames of media content to determine the spatial complexity of the one or more frames. The filtering techniques can be applied in addition to or alternatively to the Fast DCT/FFT techniques described herein. The spatial complexity of the one or more frames may be determined based on analyzing the one or more frames through the one or more filters. The more edges a frame has, and particularly, the more small edges a frame has, the higher its estimated spatial complexity. Thus, smaller GOP sizes may be used to achieve better coding efficiency. Frames with a fewer number of edges may have less fine details within the picture, and as a result, may be encoded using larger GOP sizes.

Determining the temporal complexity of the one or more frames of the media content may comprise determining an amount of motion in the one or more frames of the media content. When it is determined that there is not much motion in the video content, such as in a video with a newscaster reading news, or a person sitting on a sofa and watching TV, the GOP size can be larger, thereby resulting in better coding efficiency by decreasing an overall amount of I or P frames. The temporal complexity of the one or more frames of the media content may be determined, for example, by applying a Mean Co-Located Pixel Difference (MCPD) metric to the one or more frames of the media content, which may indicate the difference between co-located pixels in consecutive frames. Variances between the frames may be calculated and evaluated. The larger the difference between the frames, the larger the motion complexity, which may lead to smaller GOP sizes.

At step 604, a GOP size for the one or more frames of the media content may be determined. At least one mini-GOP and corresponding mini-GOP size for the one or more frames of the media content may be determined. The GOP size and the mini-GOP size for the one or more frames of the media content may be determined by an encoder, such as the encoder 108 shown in FIG. 1. The GOP size and the mini-GOP size for the one or more frames of the media content may be determined based on analyzing the spatial complexity associated with the one or more frames of the media content and/or the temporal complexity associated with the one or more frames of the media content.

The encoder may be configured to determine an optimal GOP size and an optimal mini-GOP size for the one or more frames of the media content. The encoder may receive from the spatial complexity module an indication of the spatial complexity of the one or more frames of the media content, such as an indication that the frames have high spatial complexity or an indication that the frames have low spatial complexity. The encoder may receive from the temporal complexity module an indication of the temporal complexity of the one or more frames of the media content, such as an indication that the frames have high temporal complexity or an indication that the frames have low temporal complexity. Based the indications received from the spatial complexity modules and/or the temporal complexity modules, the encoder may determine an appropriate GOP and mini-GOP size for the one or more frames of the media content and may encode the one or more frames of the media content based on the determined GOP size and the determined mini-GOP size.

A GOP may comprise one or more of an I-frame, a P-frame and a B-frame. A GOP may begin with an I-frame and may comprise any number of P and B frames following I-frame. The GOP may terminate with the frame that immediately precedes the next I-frame in the sequence of frames. A mini-GOP may comprise a portion of the GOP. The mini-GOP may begin with a P-frame and end with a next P-frame in the sequence of frames. As shown in FIG. 2A, a GOP may comprise eight frames ordered in the following sequence: I, P, B, B, P, P, B, P. The GOP may comprise one or more mini-GOPs. A first mini-GOP may comprise the second frame (P-frame), the third frame (B-frame), the fourth frame (B-frame) and the fifth frame (P-frame). A second mini-GOP may comprise the sixth frame (P-frame), the seventh frame (B-frame), and the eight frame (P-frame).

At step 606, the one or more frames of the media content may be encoded. The one or more frames of the media content may be encoded by an encoder, such as the encoder 108 shown in FIG. 1. The one or more frames of the media content may be encoded based on the determined GOP size for the one or more frames of the media content and the determined mini-GOP size for the one or more frames of the media content. The GOP size for the one or more frames of the media content may be different than a GOP size for one or more other frames of the plurality of frames of the media content. The mini-GOP size for the one or more frames of the media content may be different than a mini-GOP size for the one or more other frames of the media content. There may additionally or alternatively be different mini-GOP sizes within the same GOP.

A first set of one or more frames of a media content (e.g., a television show) may be determined to have low spatial complexity and/or low temporal complexity, and thus may be encoded using a large GOP size. A second set of one or more frames of the same media content may be determined to have high spatial complexity and/or high temporal complexity, and thus may be encoded using a small GOP size. Thus, certain frames of the media content may be arranged in a different GOP size as compared to one or more other frames of the media content. By varying the GOP size of the plurality of frames of the media content, the bitrate of the media content may be decreased without decreasing or substantially decreasing the overall quality of the media content.

At least one mini-GOP and at least one corresponding mini-GOP size for the one or more frames of the media content may be determined based on analyzing the spatial complexity associated with the one or more frames of the media content and the temporal complexity associated with the one or more frames of the media content. The procedures for determining the mini-GOP size for the one or more frames of the media content may be similar to the procedures for determining the GOP sizes for the one or more frames of the media content. The one or more frames of the media content may be encoded based on the determined mini-GOP size for the one or more frames of the media content.

The GOP and/or the mini-GOP size of one or more frames of media content change dynamically throughout the encoding process. A first set of one or more frames of the media content may comprise a first scene of the media content, such as a first scene of a television show. The first set of the one or more frames of media content may be determined to have high spatial complexity and/or high temporal complexity. Based on this determination, the first set of one or more frames of the media content may be encoded using a small GOP, such as 8 frames of media content. However, the GOP size of the frames of the media content may change dynamically/adaptively throughout the encoding process based on the spatial complexity and/or the temporal complexity of the frames of the media content. For example, a second set of frames of the media content (e.g., a next scene in the same television show) may comprise frames having low spatial complexity and/or low temporal complexity. Thus, the second set of one or more frames of the media content may be encoded using a large GOP, such as 32 frames of media content. It is understood that the one or more frames of the mini-GOP may change dynamically/adaptively as well throughout the encoding process of the one or more frames of media content.

Figure 7:
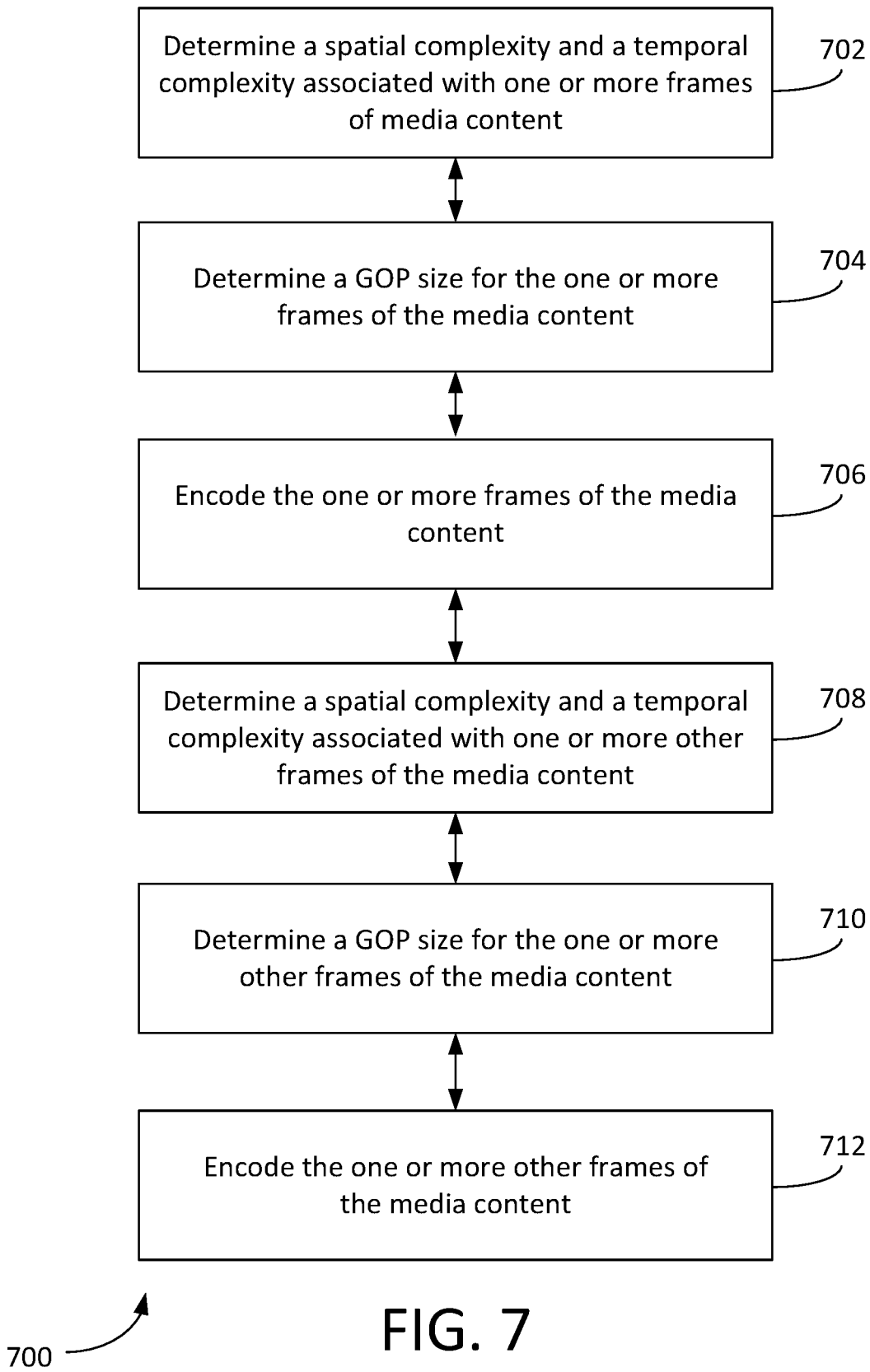
FIG. 7 shows a flow chart of an example method.

FIG. 7 shows a flow chart of an example method 700. At step 702, a spatial complexity associated with one or more frames of media content and a temporal complexity associated with the one or more frames of the media content may be determined. The spatial complexity associated with one or more frames of the plurality of frames of media content may be determined by a spatial complexity module, such as the spatial complexity module 104 shown in FIG. 1. The temporal complexity of the one or more frames of the media content may be determined by a temporal complexity module 106 of a server, such as the temporal complexity module 106 of the server 102 shown in FIG. 1. It should be noted that either spatial and/or temporal complexity of the media content may be determined by a video encoder during an encoding process. In addition, it should be noted that either spatial and/or temporal complexity may be determined in real-time during, for example, a multimedia live streaming event/teleconferencing, or offline such as during the encoding of Video-on-Demand (VoD) multimedia content. Further, it should be noted that either spatial and/or temporal complexity of the media content may be determined by the encoder during a pre-processing stage prior to the above-mentioned encoding process.

Determining the spatial complexity of the one or more frames of media content may comprise applying at least one of a Fast Discrete Cosine Transform (DCT) or a Fast Fourier Transform (FFT) to the one or more frames of the media content. One or more transformed coefficients generated from the application of the Fast DCT or the FFT to the one or more frames of the media content may be analyzed to determine an amount of low frequency information and/or an amount of high frequency information concentrated within the coefficients as compared to the overall amount of information.

Determining the spatial complexity associated with the one or more frames of the media content may comprise applying one or more filters to the one or more frames of the media content. The spatial complexity module may be configured to apply one or more filters, such as an edge detection filter and/or a high pass filter, to the one or more frames of media content to determine the spatial complexity of the one or more frames. The filtering techniques can be applied in addition to or alternatively to the Fast DCT/FFT techniques described herein. The spatial complexity of the one or more frames may be determined based on analyzing the one or more frames through the one or more filters. The more edges a frame has, and particularly, the more small edges a frame has, the higher its estimated spatial complexity. Thus, smaller GOP sizes may be used to achieve better coding efficiency. Frames with a fewer number of edges may have less fine details within the picture, and as a result, may be encoded using larger GOP sizes.

Determining the temporal complexity of the one or more frames of the media content may comprise determining an amount of motion in the one or more frames of the media content. When it is determined that there is not much motion in the video content, such as in a video with a newscaster reading news, or a person sitting on a sofa and watching TV, the GOP size can be larger, thereby resulting in better coding efficiency by decreasing an overall amount of I or P frames. The temporal complexity of the one or more frames of the media content may be determined, for example, by applying a Mean Co-Located Pixel Difference (MCPD) metric to the one or more frames of the media content, which may indicate the difference between co-located pixels in consecutive frames. Variances between the frames may be calculated and evaluated. The larger the difference between the frames, the larger the motion complexity, which may lead to smaller GOP sizes.

At step 704, a GOP size for the one or more frames of the media content may be determined. The GOP size for the one or more frames of the media content may be determined by an encoder, such as the encoder 108 shown in FIG. 1. The GOP size for the one or more frames of the media content may be determined based on analyzing the spatial complexity associated with the one or more frames of the media content and/or the temporal complexity associated with the one or more frames of the media content.

The encoder may be configured to determine an optimal GOP size for the one or more frames of the media content. The encoder may receive from the spatial complexity module an indication of the spatial complexity of the one or more frames of the media content, such as an indication that the frames have high spatial complexity or an indication that the frames have low spatial complexity. The encoder may receive from the temporal complexity module an indication of the temporal complexity of the one or more frames of the media content, such as an indication that the frames have high temporal complexity or an indication that the frames have low temporal complexity. Based the indications received from the spatial complexity modules and/or the temporal complexity modules, the encoder may determine an appropriate GOP size for the one or more frames of the media content and may encode the one or more frames of the media content based on the determined GOP size.

Based on receiving an indication that one or more frames of the media content have low spatial complexity and/or low temporal complexity, the encoder may be configured to encode one or more frames of the media content using a large GOP size, such as 64 frames. Based on receiving an indication that one or more other frames of the media content have high spatial complexity and/or high temporal complexity, the encoder may be configured to encode the one or more other frames of the media content using a small GOP size, such as 8 frames. The GOP size for the one or more frames of the media content may be inversely proportional to the spatial complexity associated with the one or more frames of the media content and the temporal complexity associated with the one or more frames of the media content.

At step 706, the one or more frames of the media content may be encoded. The one or more frames of the media content may be encoded by an encoder, such as the encoder 108 shown in FIG. 1. The one or more frames of the media content may be encoded based on the determined GOP size for the one or more frames of the media content. The GOP size for the one or more frames of the media content may be different than a GOP size for one or more other frames of the plurality of frames of the media content.

At step 708, a spatial complexity associated with one or more other frames of media content and a temporal complexity associated with the one or more other frames of the media content may be determined. The spatial complexity associated with one or more other frames of the plurality of frames of media content may be determined by the spatial complexity module 104 shown in FIG. 1. The temporal complexity of the one or more other frames of the media content may be determined by the temporal complexity module 106 shown in FIG. 1. The spatial complexity of the one or more other frames of the media content and the temporal complexity of the one or more other frames of the media content may be determined using similar procedures as those used in determining the spatial complexity and the temporal complexity of the one or more frames of the media content.

At step 710, a GOP size for the one or more other frames of the media content may be determined. The GOP size for the one or more other frames of the media content may be determined by the encoder 108 shown in FIG. 1. The GOP size for the one or more other frames of the media content may be determined based on analyzing the spatial complexity associated with the one or more other frames of the media content and/or the temporal complexity associated with the one or more other frames of the media content. The GOP size for the one or more other frames of the media content may be determined using similar procedures as those used in determining the spatial complexity and the temporal complexity for the one or more frames of the media content.

At step 712, the one or more other frames of the media content may be encoded. The one or more other frames of the media content may be encoded by the encoder 108 shown in FIG. 1. The one or more other frames of the media content may be encoded based on the determined GOP size for the one or more other frames of the media content.

The GOP size for the one or more frames of the media content may be different than the GOP size for one or more other frames of the plurality of frames of the media content. For example, a first set of one or more frames of a media content (e.g., a television show) may be determined to have low spatial complexity and/or low temporal complexity, and thus may be encoded using a large GOP size. A second set of one or more frames of the same media content may be determined to have high spatial complexity and/or high temporal complexity, and thus may be encoded using a small GOP size. Thus, certain frames of the media content may be arranged in a different GOP size as compared to one or more other frames of the media content. By varying the GOP size of the plurality of frames of the media content, the bitrate of the media content may be decreased without decreasing or substantially decreasing the overall quality of the media content. The amount of GOPs and the size of each GOP can vary according to (or be proportional to) a number of scenes of the media content to be encoded. Similarly, the amount of mini-GOPs and the size of each mini-GOP can vary according to (or be proportional to) the above-mentioned number of scenes as well.

At least one mini-GOP and at least one corresponding mini-GOP size for the one or more frames of the media content may be determined based on analyzing the spatial complexity associated with the one or more frames of the media content and the temporal complexity associated with the one or more frames of the media content. The procedures for determining the mini-GOP size for the one or more frames of the media content may be similar to the procedures for determining the GOP sizes for the one or more frames of the media content. The one or more frames of the media content may be encoded based on the determined mini-GOP size for the one or more frames of the media content.

The GOP and/or the mini-GOP size of one or more frames of media content change dynamically throughout the encoding process. A first set of one or more frames of the media content may comprise a first scene of the media content, such as a first scene of a television show. The first set of the one or more frames of media content may be determined to have high spatial complexity and/or high temporal complexity. Based on this determination, the first set of one or more frames of the media content may be encoded using a small GOP, such as 8 frames of media content. However, the GOP size of the frames of the media content may change dynamically throughout the encoding process based on the spatial complexity and/or the temporal complexity of the frames of the media content. For example, a second set of frames of the media content (e.g., a next scene in the same television show) may comprise frames having low spatial complexity and/or low temporal complexity. Thus, the second set of one or more frames of the media content may be encoded using a large GOP, such as 32 frames of media content. It is understood that the one or more frames of the mini-GOP may change dynamically as well throughout the encoding process of the one or more frames of media content.

Figure 8:
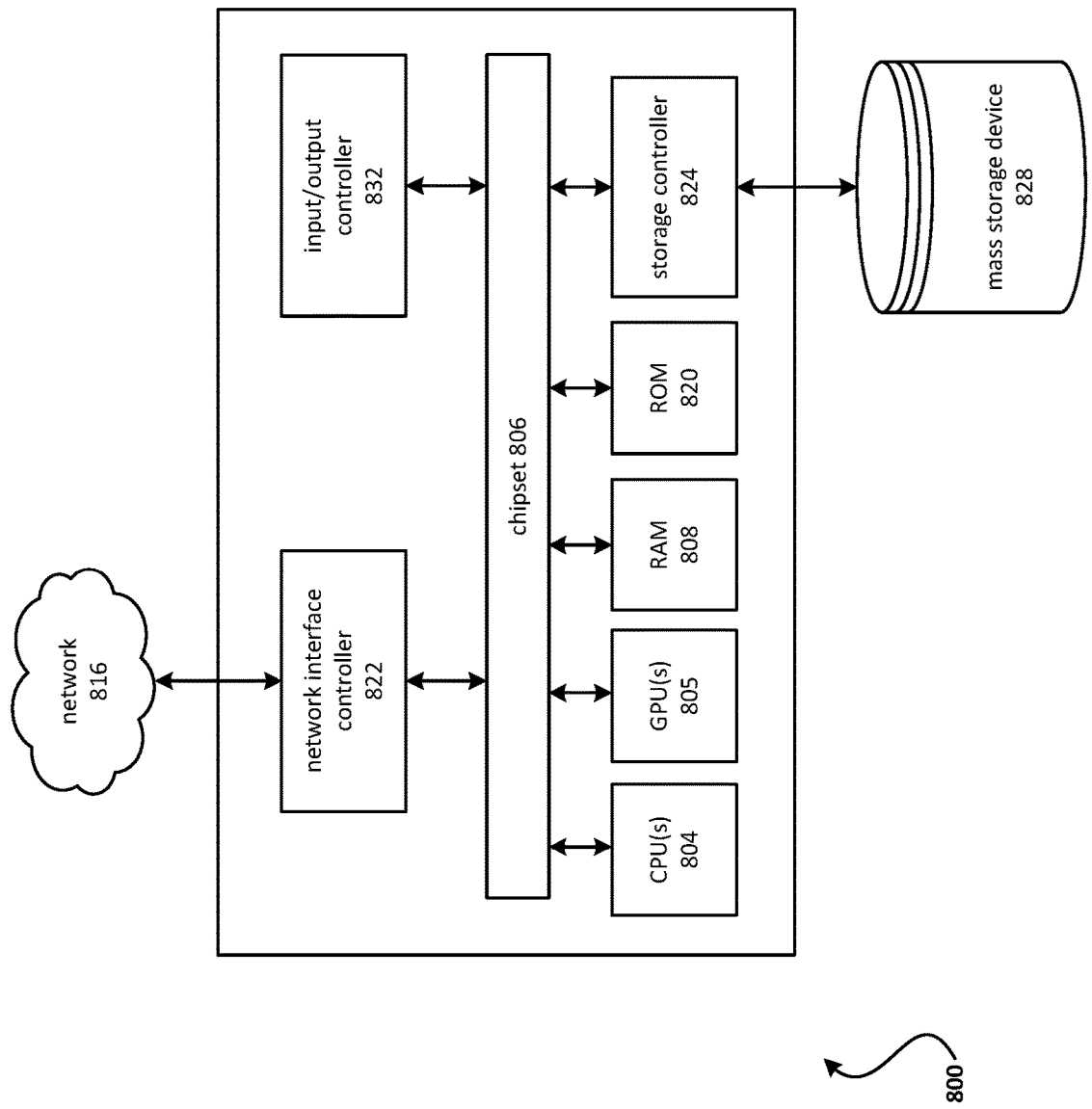
FIG. 8 shows a block diagram of an example computing device.

FIG. 8 depicts a computing device that may be used in various aspects, such as the servers, modules, and/or devices depicted in FIG. 1. With regard to the example architecture of FIG. 1, the user device 102, server 120, and/or the audio device 140 may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 5-7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or nonvolatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 5-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A computer-readable medium storing instructions that, when executed, cause:
   determining a spatial feature value associated with one or more frames of a plurality of frames of content;
   determining a temporal feature value associated with two or more frames of the plurality of frames of the content;
   determining a Group of Picture (GOP) size for a first group of frames of the plurality of frames of the content, the first group of frames comprising the one or more frames and the two or more frames, and the GOP size for the first group of frames being inversely proportional to the spatial feature value and the temporal feature value; and
   encoding, based on the determined GOP size for the first group of frames of the content, the first group of frames of the content.

2. The computer-readable medium of claim 1, wherein the instructions, when executed, cause determining the spatial feature value comprise instructions that, when executed, cause at least one of applying a Fast Discrete Cosine Transform (Fast DCT) to the one or more frames of the content or applying one or more filters to the one or more frames of the content.

3. The computer-readable medium of claim 2, wherein the instructions, when executed, cause applying the one or more filters to the one or more frames of the content comprise instructions that, when executed, cause applying at least one of an edge detection filter or a high pass filter to the one or more frames of the content.

4. The computer-readable medium of claim 1, wherein the instructions, when executed, cause determining the temporal feature value comprise instructions that, when executed, cause applying a Mean Co-Located Pixel Difference (MCPD) metric to the two or more frames of the content.

5. The computer-readable medium of claim 1, wherein the instructions, when executed, further cause determining, based on the spatial feature value and the temporal feature value, a hierarchical structure associated with the GOP.

6. The computer-readable medium of claim 1, wherein the instructions, when executed, further cause:
   determining, based on the spatial feature value and the temporal feature value, at least one mini-GOP and at least one mini-GOP size for the first group of frames of the content; and
   encoding, based on the determined at least one mini-GOP size for the first group of frames of the content, the first group of frames of the content, wherein the mini-GOP comprises a portion of the GOP.

7. The computer-readable medium of claim 6, wherein:
   the GOP begins with an I-frame and ends at a frame immediately preceding another I-frame; and
   the at least one of the mini-GOP begins with a P-frame.

8. The computer-readable medium of claim 6, wherein at least one of the GOP size and the mini-GOP size changes adaptively throughout an encoding process for the plurality of frames of content.

9. The computer-readable medium of claim 1, wherein:
   the instructions, when executed, cause determining the spatial feature value comprise instructions that, when executed, cause performing one or more pre-processing operations on the one or more frames of the content; and
   the instructions, when executed, cause determining the temporal feature value comprise instructions that, when executed, cause performing one or more pre-processing operations on the two or more frames of the content.

10. The computer-readable medium of claim 1, wherein the spatial feature value is a spatial complexity, and the temporal feature value is a temporal complexity.

11. The computer-readable medium of claim 1, wherein:
   the instructions, when executed, cause determining the spatial feature value comprise instructions that, when executed, cause determining an amount of high frequency information in the one or more frames of the content, and
   the instructions, when executed, cause determining the temporal feature value comprise instructions that, when executed, cause determining an amount of motion in the two or more frames of the content.

12. A device comprising:
   one or more processors; and
   memory storing instructions that, when executed by the one or more processors, cause the device to:
      determine a spatial feature value associated with one or more frames of a plurality of frames of content;
      determine a temporal feature value associated with two or more frames of the plurality of frames of the content;
      determine a Group of Picture (GOP) size for a first group of frames of the plurality of frames of the content, the first group of frames comprising the one or more frames and the two or more frames, and the GOP size for the first group of frames being inversely proportional to the spatial feature value and the temporal feature value; and
      encode, based on the determined GOP size for the first group of frames of the content, the first group of frames of the content.

13. The device of claim 12, wherein the instructions, when executed by the one or more processors, further cause the device to determine the spatial feature value by applying a Fast Discrete Cosine Transform (Fast DCT) to the one or more frames of the content or applying one or more filters to the one or more frames of the content.

14. The device of claim 13, wherein applying the one or more filters to the one or more frames of the content comprises applying at least one of an edge detection filter or a high pass filter to the one or more frames of the content.

15. The device of claim 12, wherein the computing device is configured to determine the temporal feature value by applying a Mean Co-Located Pixel Difference (MCPD) metric to the two or more frames of the content.

16. The device of claim 12, wherein the instructions, when executed by the one or more processors, further cause the device to determine, based on the spatial feature value and the temporal feature value, a hierarchical structure associated with the GOP.

17. The device of claim 12, wherein the instructions, when executed by the one or more processors, further cause the device to:
determine, based on the spatial feature value and the temporal feature value, at least one mini-GOP and at least one mini-GOP size for the first group of frames of the content; and
encode, based on the determined at least one mini-GOP size for the first group of frames of the content, the first group of frames of the content, wherein the mini-GOP comprises a portion of the GOP.

18. The device of claim 17, wherein:
the GOP begins with an I-frame and ends at a frame immediately preceding another I-frame; and
the at least one of the mini-GOP begins with a P-frame.

19. The device of claim 17, wherein at least one of the GOP size and the mini-GOP size changes adaptively throughout an encoding process for the plurality of frames of content.

20. The device of claim 12, wherein the instructions, when executed by the one or more processors, further cause the device to:
determine the spatial feature value by performing one or more pre-processing operations on the one or more frames of the content; and
determine the temporal feature value by performing one or more pre-processing operations on the two or more frames of the content.

21. The device of claim 12, wherein the spatial feature value is a spatial complexity, and the temporal feature value is a temporal complexity.

22. The device of claim 12, wherein the instructions, when executed by the one or more processors, further cause the device to:
determine the spatial feature value by determining an amount of high frequency information in the one or more frames of the content, and
determine the temporal feature value by determining an amount of motion in the two or more frames of the content.

23. A computer-readable medium storing instructions that, when executed, cause:
determining at least one of a spatial feature value associated with one or more frames of content or a temporal feature value associated with two or more frames of the content;
determining, based on the temporal feature value or the spatial feature value, a Group of Picture (GOP) size and at least one mini-GOP size for a first group of frames of the content, the first group of frames comprising the one or more frames and the two or more frames, the mini-GOP comprises a portion of the GOP, and the GOP size for the first group of frames being inversely proportional to the spatial feature value or the temporal feature value; and
encoding, based on the determined GOP size and the at least one mini-GOP size, the first group of frames of the content.

24. The computer-readable medium of claim 23, wherein the instructions, when executed, cause determining the spatial feature value comprise instructions that, when executed, cause at least one of:
applying a Fast Discrete Cosine Transform (Fast DCT) to the one or more frames of the content or applying a filter to the one or more frames of the content, and
wherein the instructions, when executed, cause determining the temporal feature value comprise instructions that, when executed, cause:
applying a Mean Co-Located Pixel Difference (MCPD) metric to the two or more frames of the content.

25. The computer-readable medium of claim 23, wherein:
the GOP begins with an I-frame and ends at a frame immediately preceding another I-frame; and
the at least one of the mini-GOP begins with a P-frame.

26. The computer-readable medium of claim 23, wherein the instructions, when executed, further cause:
determining, based on the at least one of the spatial feature value or the temporal feature value, a hierarchical structure associated with the GOP.

27. The computer-readable medium of claim 23, wherein at least one of the GOP size or the mini-GOP size changes adaptively throughout an encoding process for the content.

28. The computer-readable medium of claim 23, wherein:
the spatial feature value is a spatial complexity, and
the temporal feature value is a temporal complexity.

29. The computer-readable medium of claim 23, wherein:
the instructions, when executed, cause determining the spatial feature value comprise instructions that, when executed, cause determining an amount of high frequency information in the one or more frames of the content, and
the instructions, when executed, cause determining the temporal feature value comprise instructions that, when executed, cause determining an amount of motion in the two or more frames of the content.

30. A device comprising:
one or more processors; and
memory storing instructions that, when executed by the one or more processors, cause the device to:
determine at least one of a spatial feature value associated with one or more frames of the content or a temporal feature value associated with two or more frames of the content;
determine, based on the temporal feature value or the spatial feature value, a Group of Picture (GOP) size and at least one mini-GOP size for a first group of frames of the content, the first group of frames comprising the one or more frames and the two or more frames, the mini-GOP comprises a portion of the GOP, and the GOP size for the first group of frames being inversely proportional to the spatial feature value or the temporal feature value; and
encode, based on the determined GOP size and the at least one mini-GOP size, the first group of frames of the content.

31. The device of claim 30, wherein the device is configured to determine the spatial feature value by at least one of:
applying a Fast Discrete Cosine Transform (Fast DCT) to the one or more frames of the content or applying a filter to the one or more frames of the content, and
wherein the device is configured to determine the temporal feature value by applying a Mean Co-Located Pixel Difference (MCPD) metric to the two or more frames of the content.

32. The device of claim 30, wherein:
the GOP begins with an I-frame and ends at a frame immediately preceding another I-frame; and
the at least one of the mini-GOP begins with a P-frame.

33. The device of claim 30, wherein the instructions, when executed by the one or more processors, further cause the device to:
  determine, based on the at least one of the spatial feature value or the temporal feature value, a hierarchical structure associated with the GOP.

34. The device of claim 30, wherein at least one of the GOP size or the mini-GOP size changes adaptively throughout an encoding process for the content.

35. The device of claim 30, wherein:
  the spatial feature value is a spatial complexity, and
  the temporal feature value is a temporal complexity.

36. The device of claim 30, wherein the instructions, when executed by the one or more processors, further cause the device to:
  determine the spatial feature value by determining an amount of high frequency information in the one or more frames of the content, and
  determine the temporal feature value by determining an amount of motion in the two or more frames of the content.

\* \* \* \* \*